US010496900B2

(12) United States Patent
Umanesan

(10) Patent No.: US 10,496,900 B2
(45) Date of Patent: Dec. 3, 2019

(54) METHODS OF CLUSTERING COMPUTATIONAL EVENT LOGS

(71) Applicant: Xyratex Technology Limited, Hampshire (GB)

(72) Inventor: Ganesan Umanesan, Guildford (GB)

(73) Assignee: Seagate Technology LLC, Cupertino, CA (US)

(*) Notice: Subject to any disclaimer, the term of this patent is extended or adjusted under 35 U.S.C. 154(b) by 1093 days.

(21) Appl. No.: 13/890,030

(22) Filed: May 8, 2013

(65) Prior Publication Data

US 2014/0334739 A1 Nov. 13, 2014

(51) Int. Cl.
*G06F 16/00* (2019.01)
*G06K 9/62* (2006.01)
(Continued)

(52) U.S. Cl.
CPC ....... *G06K 9/6272* (2013.01); *G06F 16/1734* (2019.01); *G06F 16/355* (2019.01);
(Continued)

(58) Field of Classification Search
CPC .......... G06F 17/30705; G06F 17/3071; G06F 17/30722; G06F 17/30737; G06F 17/276; G06F 17/2795; G06F 17/2818; G06F 11/3616; G06F 17/2735; G06F 11/3452; G06F 11/079; G06F 11/0709; G06F 16/1734; G06F 16/285; G06F 16/35;
(Continued)

(56) References Cited

U.S. PATENT DOCUMENTS 5,892,898 A * 4/1999 Fujii ................... G06F 11/0709
714/57
6,119,079 A * 9/2000 Wang .................... G06F 9/4448
704/8
(Continued)

FOREIGN PATENT DOCUMENTS

EP 1 881 668 * 10/2009

OTHER PUBLICATIONS

Charu C. Aggarwal et al., "On the Surprising Behavior of Distance Metrics in High Dimensional Space", Springer-Verlag Berlin Heidelberg 2001ICDT 2001, LNCS 1973, pp. 420-434, 2001.*
(Continued)

*Primary Examiner* — Srirama Channavajjala
(74) *Attorney, Agent, or Firm* — Mueting, Raasch & Gebhardt, P.A.

(57) ABSTRACT

Methods are presented suitable for clustering computational event logs (2) including a method for calculating a metric distance between characters of different event messages (4) by comparing both characters to a comparative set of characters. Methods are presented for calculating a metric distance between two event messages (4) comprising determining character metric distances between characters in the compared words and word metric distances between the words in the compared events (4), Methods are presented for creating an area (8) in metric space corresponding to a new cluster (6) when a further event message (26) is found in an overlap region (24) of existing clusters (6, 8). Methods are presented in populating and constructing an event table.

26 Claims, 5 Drawing Sheets

(51) Int. Cl.
*G06F 16/68* (2019.01)
*G06F 16/906* (2019.01)
*G06F 16/17* (2019.01)
*G06K 9/68* (2006.01)
*G06F 16/35* (2019.01)

(52) U.S. Cl.
CPC .......... *G06F 16/686* (2019.01); *G06F 16/906* (2019.01); *G06K 9/6878* (2013.01)

(58) Field of Classification Search
CPC ...... G06F 16/355; G06F 16/45; G06F 16/906; G06F 16/686; G06K 9/6276; G06K 9/64; G06K 9/6222; G06K 9/6223; H03M 13/1171; H04L 41/06; H04L 43/06
See application file for complete search history.

(56) References Cited

U.S. PATENT DOCUMENTS

| | | | | |
|---|---|---|---|---|
| 6,226,640 | B1* | 5/2001 | Ostrovsky | G06F 17/30985 |
| 8,095,830 | B1 | 1/2012 | Cohen et al. | |
| 8,909,764 | B2* | 12/2014 | Umanesan | H04L 67/16 370/395.4 |
| 9,130,969 | B2* | 9/2015 | Umanesan | H04L 67/1097 |
| 9,244,755 | B2* | 1/2016 | Huang | G06F 11/079 |
| 2005/0125807 | A1* | 6/2005 | Brady, Jr. | H04L 41/06 719/318 |
| 2005/0132197 | A1* | 6/2005 | Medlar | H04L 51/12 713/176 |
| 2005/0149473 | A1 | 7/2005 | Weare | |
| 2006/0271826 | A1* | 11/2006 | Desai | H04L 43/06 714/38.1 |
| 2007/0157302 | A1* | 7/2007 | Ottamalika | H04L 63/0263 726/11 |
| 2008/0134209 | A1 | 6/2008 | Bansal et al. | |
| 2010/0312549 | A1* | 12/2010 | Akuwudike | G06F 17/276 704/9 |
| 2010/0332216 | A1* | 12/2010 | Williams | G06F 17/2872 704/4 |
| 2011/0055212 | A1 | 3/2011 | Tsai et al. | |
| 2011/0066908 | A1 | 3/2011 | Bartz et al. | |
| 2011/0185234 | A1* | 7/2011 | Cohen | G06F 11/3476 714/37 |
| 2011/0202483 | A1* | 8/2011 | Bergman | G06F 11/32 706/11 |
| 2011/0296244 | A1 | 12/2011 | Fu et al. | |
| 2012/0089551 | A1* | 4/2012 | Ebadollahi | G06N 99/005 706/48 |

OTHER PUBLICATIONS

United Kingdom Search Report dated Oct. 31, 2013 in corresponding Great Britain Patent Application No. GB1308286.2.
United Kingdom Search Report dated Dec. 16, 2013 in corresponding Great Britain Patent Application No. GB1308286.2.
Sergio Jimenez et al., "Generalized Mongue-Elkan Method for Approximate Text String Comparison," Computational Linguistics and Intelligent Text Processing, pp. 559-570 (Mar. 1, 2011).
Edwin Lughofer, "Dynamic Evolving Cluster Models using On-line Split-and-Merge Operations," 10th International Conference on Machine Learning and Applications (ICMLA), vol. 2, pp. 20-26 (Dec. 18, 2011).
Sourabh Jain et al., "Extracting the Textual and Temporal Structure of Supercomputing Logs," International Conference on High Performance Computing (HiPC), pp. 254-263 (Dec. 12, 2009).
Adetokunbo Makanju et al., "An Evaluation of Entropy Based Approaches to Alert Detection in High Performance Cluster Logs," IEEE (10 pages) 2010.
Edward Chuah et al., "Diagnosing the Root-Causes of Failures from Cluster Log Files," IEEE (10 pages) 2010.
Adam Oliner et al., "What Supercomputers Say: A Study of Five System Logs," Proceedings of the 2007 International Conference on Dependable Systems and Networks (DSN), (10 pages) 2007.
"Operational Intelligence, Log Management, Application Management, Enterprise Security," Accessed Jul. 8, 2013, http://www.splunk.com (2 pages).
"Business Analytics and Business Intelligence Leaders—Pentaho," Accessed Jul. 8, 2013, http://www.pentaho.com (2 pages).
"Chukwa—Hadoop Wiki," Accessed Jul. 8, 2013, http://wiki.apache.org/hadoop/Chukwa.com (2 pages).

* cited by examiner

METHODS OF CLUSTERING COMPUTATIONAL EVENT LOGS

The present invention is in the field of computer program event analysis, more specifically in the field of clustering computational error logs.

Computers use file systems that allow for and manage access to data on computer hardware. Many different file systems exist including disk file systems such as FAT and device file systems such as Linux. For high performance computing (HPC) using large scale computing clusters, parallel distributed file systems are generally used, for example the Lustre™ file system.

Such file systems typically record events to allow the computer processes and outcomes to be audited. This is commonly known as computer data logging, where the common standard for logging events is known as Syslog™ which separates the message generating software from the storing system and the message analysing system.

Failures and errors generate event logs which are a feature of modern computer systems. Event logs consist of lines of programmer/developer written messages which contain alert/warning/information messages about the system health at a particular space and time, i.e., timestamps and host/node names. This makes event logs a rich source of information for system diagnostics.

The possibility of an error or a failure is increased when many interdependent storage, network and computer subsystems need to co-operate and communicate to achieve a seamless synergy of a single system without any collisions. Thus failures are commonplace in HPC systems due to their massive scale and complexity. The dependability, reliability and availability of HPC systems greatly depend on their ability to either completely avoid or quickly recover from failures.

System event log analytics try to provide important insight into the past and present behaviour of the system and enable the prediction of the health of the system in the future. Event logs are, however, unstructured. The event messages are written by individual programmers/developers to assist them with debugging the system at a very deep technical level and are inherently difficult to work with by others. Thus, the cryptic, technical, and voluminous event messages make log analysis a daunting task. System administrators and network administrators in small computing environments perform manual log analysis.

Manual event analysis is not an option for large HPCs because thousands of storage, network and compute systems generate massive amounts of complex, cryptic and unstructured content. Automated log analysis of HPC Lustre file system logs for alert detection and anomaly identification are currently under investigation, for example in the following publications.

"An Evaluation of Entropy Based Approaches to Alert Detection in High Performance Cluster Logs", by A. Makanju, A. Zincir-Heywood and E. Milios, IEEE QEST 2010.

"Diagnosing the Root-Causes of Failures from Cluster Log Files" by Edward Chuah, et al., 2010 International Conference on High Performance Computing.

"What supercomputers say: A study of five system logs" by A. J. Oliner and J. Stearley, Proceedings of the 2007 International Conference on Dependable Systems and Networks (DSN), 2007.

A number of commercial and open source tools are available to tackle the problem at small scales in limited environments, for example:

Splunk. http://www.splunk.com/
Pentaho http://www.pentaho.com/
Chukwa http://wiki.apache.org/hadoop/Chukwa An important aspect of any automated log analysis is data mining the massive amounts of unstructured cryptic log messages for sensible event types. Once sensible event types are extracted, each log message can be assigned with a matching event type thereby creating some structure from completely nonsensical initially unstructured data. This is commonly known as clustering event logs.

Some approaches evaluate clusters using metric mathematics whereby a metric (otherwise known as a 'distance function') is used to define a distance between two event logs. Several different distance functions exist that define how the distance is metricised including Hamming distance, Levenshtein distance and Cosine similarity. Metric distances are often conceptualised in a metric space and known methods of calculating the distance function directly compare the values in the different character strings being evaluated.

FIG. 1 shows an example of some event logs generated by a Lustre file system in an HPC environment. FIG. 2 shows the different fields in typical event logs. Each event log is a string of characters subdivided sequentially into a time field (otherwise known as the event time stamp) a space field (otherwise known as the event hostname) and the event message. The event message can be further subdivided into a class field, a facility field and a message field.

Clustering events is the task of grouping similar events together such that event messages within a cluster are similar or the same. Typically, pair-wise disjoint subsets of similar/same events are created as shown in FIG. 3 which shows a conceptualisation of a plurality of points clustered into 4 subsets denoted by the subscripts A, B, C and D where each subset contains similar (geometrically close) points. The term 'pairwise disjoint subsets' refers to a collection of sets, in this case event clusters, where any two sets in the collection have no element in common. All subsets A, B, C and D are pair-wise disjoint and the union of all them represent the original entire set.

Analysing historical event logs from HPC systems often involves dealing with a large amount of event logs because modern computers, especially HPC systems, generate an enormous amount of events in a short span of time. Representing a cluster simply as a set with points, i.e. a collocation of all similar event messages, incurs a large memory footprint, leading to incredibly slow analysis when it comes to finding out which cluster a given event message belongs to.

Treating the event log as a metric space M where a distance function d is defined for any two given event messages is used to enable efficient clustering and analysis.

A metric ball in metric space (such as an open ball or a closed ball) can be used to represent clusters of event logs. Mathematically, each ball can be represented by a centre point p and a radius r. The ball contains a set of nearby points which are similar to each other.

An open metric ball of radius r and centre p in M is a ball that contains event logs within the space inside the ball but excluding events on its boundary. It is denoted and defined as follows:

$$B(r,p) \triangleq \{x \in M | d(p,x) < r\} \quad \text{Equ. 1}$$

A closed metric ball of radius r and centre p in M is a ball that contains event logs within the space inside the ball including events on its boundary. It is denoted and defined as follows:

$$B(r,p) \triangleq \{x \in M | d(p,x) \leq r\} \quad \text{Equ. 2}$$

In the above equations 1 and 2, d(p, x) denotes the distance between points p and x.

When using a discrete metric space to describe event messages, where the distance between any two points is zero or a positive integer, the closed ball B(r, p) and open ball B(r+1, p) are the same. Therefore, it is not necessary to distinguish between open and closed balls in the mathematical analysis. We can simply refer to them as metric balls meaning they are either open balls or closed balls, not a mix of both.

A pairwise disjoint event cluster can be effectively represented by a metric ball in the metric space if a metric ball exists comprising a covering of that particular cluster and contains no other points than the points contained in the cluster itself. This is geometrically illustrated in FIG. 3 where the clusters A, B, C, and D, are subsets of metric balls $B(R_A,X_A)$, $B(R_B,X_B)$, $B(R_C,X_C)$, and $B(R_D,X_D)$. The figures herein illustrating metric balls and event messages depict metric balls as two dimensional (2D) circles with two dimensional clusters of event messages. Metric balls are not circles, but balls in metric space and the circle drawings used to show them are purely for conceptual understanding of how different event messages may be covered by different metric balls.

Even though each metric ball is a covering of the cluster, it contains no other points than points already contained in the cluster. Thus, the collection of subsets is pairwise disjoint. This can be stated mathematically as follows:

$$s \subseteq B(R_s,X_s) | B(R_s,X_s) \backslash s = \emptyset \forall s \in \{A,B,C,D\} \quad \text{Equ. 3}$$

Geometrically, the metric balls may or may not intersect depending on their centre points and radius, but no points of the event metric space belongs to more than one metric ball. Geometrically, in FIG. 3, the metric ball $B(R_B,X_B)$ is completely isolated from other balls. Both of the metric ball pairs $B(R_A,X_A)$, $/B(R_D,X_D)$ and $B(R_C,X_C)/B(R_D,X_D)$ intersect, however, both of these intersections contain no points from the event metric space.

According to a first aspect of the invention there is provided a method of determining a metric distance in a metric space between: a first character associated with a first computational event message; a second character associated with a second computational event message; comprising the steps of: comparing both the first and second characters to a comparative set of characters; outputting a first predefined metric distance when both of the first and second characters comprises a character from the said comparative set.

The method may further comprise the steps of: comparing the first character with the second character; and, outputting a fundamental predefined metric distance if the first and second characters are identical.

The method may further comprise the steps of: comparing the first character with the second character; and, outputting a second predefined metric distance if: the first and second characters are non-identical; and, at least one of the first or second characters does not comprise a character from the set.

The step of outputting a second predefined metric distance may further comprise: outputting a first value for the second predefined metric distance if: the first character comprises a character from the said comparative set; and, the second character does not comprise a character from the said comparative set; or, outputting a second value for the second predefined metric distance if: the first character does not comprises a character from the said comparative set; and, the second character comprises a character from the said comparative set; or, outputting a third value for the second predefined metric distance if: the first character does not comprises a character from the said comparative set; and, the second character does not comprises a character from the said comparative set.

The fundamental metric distance may be zero.

The first predefined metric distance may be zero.

The first predefined metric distance may be non-zero.

The second predefined metric distance may be non-zero.

The second predefined metric distance may be greater than the first predefined metric distance.

The first and second values of the second predefined metric distance may be identical.

The first and second values of the second predefined metric distance may be non-identical, The third value of the second predefined metric distance may be greater than both the first and second values of the second predefined metric distance.

The numerical difference between the first and second values of the second predefined metric distance may be smaller than the numerical difference between any of: the first and third values of the second predefined metric distance; or, the second and third values of the second predefined metric distance.

The numerical difference between the first and fundamental metric distances may be smaller than any of: the numerical difference between the first value of the second predefined metric distance and the first predefined metric distance; or, the numerical difference between the second value of the second predefined metric distance and the first predefined metric distance; or, the numerical difference between third value of the second predefined metric distance and the first predefined metric distance.

The third value of the second predefined metric distance may be at least ten times greater than the value of any of the first and second values of the second predefined metric distance.

The step of outputting a first predefined metric distance may further comprise the steps of: comparing the first character with the second character; and, outputting the first predefined metric distance if the first and second characters are different.

Any of the first, second and third values of the second predefined metric distance may comprise a unit distance in metric space.

The first character may comprise a character selected from a first set of characters.

The second character may comprise a character selected from a second set of characters.

The first and second sets of characters may comprise alphanumeric characters.

The first and second sets of characters may be identical.

The comparative set of characters may comprise part of the first or second sets of characters, The comparative set of characters may be a predefined set of characters.

The comparative set of characters may comprise decimal characters.

The comparative set of characters may comprise the characters {0, 1, 2, 3, 4, 5, 6, 7, 8, 9}.

The comparative set of characters may comprise hexadecimal characters.

The comparative set of characters may comprise the characters {A, B, C, D, E, F, a b, c, d, e, f, 0, 1, 2, 3, 4, 5, 6, 7, 8, 9}.

The first computational event message may be associated with a first computational event log; and, the second computational event message may be associated with a second computational event log.

According to a second aspect of the invention there is provided a method of calculating a distance in metric space between computational event messages, each computational event message comprising a set of one or more words, the method comprising the steps of: determining for each word in a first set of one or more words that corresponds to a word in a second set of one or more words, a word metric distance between said words by: determining for each character in the said word of the first set that corresponds to a character in the said word in the second set, a character metric distance between the said characters; summing the said character metric distances; summing the said word metric distances.

The method may calculate a distance in metric space between computational event messages comprising the steps of: providing a first event message associated with a first event log; the first event message comprising a first word sequence of one or more computational words; wherein each of said one or more computational words comprises a sequence of one or more characters; providing a second event message associated with a second event log; the second event message comprising a second word sequence of one or more computational words; wherein each of said one or more computational words comprises a sequence of one or more characters; determining, in sequence, for each word in the first word sequence that corresponds to a word in the second word sequence, a word metric distance between said words by: determining, in sequence, for each character in the said word of the first sequence that corresponds to a character in the said word in the second word sequence, a character metric distance between the said characters; summing the said character metric distances; summing the said word metric distances.

The step of: providing the first event message, may further comprise the steps of: providing a first event log comprising the first event message; extracting the first event message from the first event log. The step of providing the second event message, may further comprise the steps of: providing a second event log comprising the second event message; extracting the second event message from the second event log.

The first and second event logs may be first and second error event logs respectively.

The method may further comprise the steps of: comparing the number of words in the first event message to the number of words in the second event message; and, increasing the metric distance between the said event messages if one of the said event messages comprises a greater number of words than the other event message.

Increasing the metric distance between the said event messages may further comprise the steps of: determining the longest event message comprising the greatest number of words; and, determining a set of words comprising, in sequence, the words of the longest event message that are in excess of the other event message; and, increasing the metric distance between the said event messages by a value associated with the said number of excess words.

Increasing the metric distance between the said event messages may further comprise the steps of: determining a set of words, comprising, in sequence, the words in the longest message in excess of the last word in the word sequence of the other event message; and, determining, for each word in the set, a word weight value associated with the number of characters in the said word; and, summing the word weight values; and, increasing the metric distance between the said event messages by the sum of the word weight values.

Determining a word metric distance between said words may further comprise the steps of: comparing the number of characters in the said word of the first word sequence to the number of characters in the said word of the second word sequence; and, increasing the word metric distance if one of the said words comprises a greater number of characters than the other said word.

Increasing the word metric distance may further comprise the steps of: determining a character weight value associated with the difference between the number of characters in the said word of the first sequence to the number of characters in the said word of the second sequence; and, increasing the word metric distance by the character weight value.

Determining the character weight value may further comprise the steps of: determining a difference value by subtracting the number of characters in the said word of the first word sequence to the number of characters in the said word of the second word sequence; taking the modulus of the difference value.

The character metric distance between the said characters may be determined using any of the methods and/or features according to the first aspect.

According to a third aspect of the invention there is provided a method of defining an area in metric space for clustering computational event messages, comprising the steps of: providing a first plurality of defined areas in metric space: wherein: each area comprises at least one of a first plurality of event messages; and, each of the said first plurality of event messages is located within one of the plurality of defined areas; providing an overlap region in metric space wherein at least two of the said plurality of defined areas partially overlap; determining whether a further event message is located in the overlap region in metric space; creating a further defined area in metric space comprising: the further event message; and, the event messages comprised within the at least two partially overlapping areas.

Each of the said first plurality of defined areas may comprise: a metric ball in metric space; and, a radius, defining the ball, extending from a central event message; wherein the central event message is one of the first plurality of event messages.

The step of creating the further area in metric space may further comprise the steps of: providing a distance in metric space, for each of the first plurality of defined areas, between: the further event message; and, the said central event message of the defined area; comparing each metric distance for each defined area to the respective radius for the defined area; determining that the further event message is within the overlap region when the metric distance, for the at least two overlapping areas, is smaller than the respective radius; creating the further defined area in metric space upon the said determination.

Determining that the further event message is within the overlap region may comprise determining when the metric distance, for the at least two overlapping areas is smaller than or equal to the respective radius.

The method may further comprise: assigning the further event message as the further central event message for the further area; providing a further radius for the further area; creating a circular further event area defined by the said further radius extending from the said further central event message.

Providing the further radius may comprise the steps of: calculating, for each of the overlapping areas, a summation value of: the radius for that area; and, the respective distance between the further event message and the central event message for the said area; selecting the largest summation value; providing the further radius based on the said selected summation value.

Providing the further radius may comprise the steps of providing the selected summation value as the further radius.

The distances between the further event message and the central event messages may be calculated by any of the method and/or features described in the second aspect.

The method may further comprise providing the step of creating a record comprising the defined areas.

The method may further comprise deleting, from the record, the areas associated with the said overlap region upon determining that the further event message is within the overlap region.

The record may be a table.

According to a fourth aspect of the invention there is provided a method of populating a table, the table comprising a first plurality of data entries wherein each of the first plurality of data entries is associated with: a defined area in metric space; and, at least one of a first plurality of computational event messages; the method comprising the step of: providing a first further data entry in the table, the first further data entry associated with a further defined area in metric space as claimed in any of claims 30-40.

The first plurality of data entries and the first further data entry may be associated with any one or more of: a radius; or, a point in metric space corresponding to a central event message; wherein each central event message corresponds to one of the first plurality of event messages.

Each of the first plurality of data entries may correspond to a different point in metric space corresponding to a different central event message. The table may comprise a second plurality of data entries; wherein each said data entry: corresponds to a different data entry comprised within the first plurality of data entries; and, comprises a radius. The method may further comprise providing a second further data entry: corresponding to the first further data entry; and, comprising a further radius.

Each corresponding first and second data entry may be located in the same row in the table.

The further radius may be determined according to the methods and/or features described in the third aspect.

The first and/or second further data entries may be inserted after the last respective data entries of the first and/or second plurality of data entries in the table.

The method may further comprise the step providing a first plurality of data entries by: providing a minimum radius; and, determining for each of the first plurality of event messages whether the said event message is located within any defined areas; the defined areas corresponding to the metric ball defined by each radii and corresponding central event message point in metric space already in the table; and, adding, to the table: the point in metric space corresponding to the event message; and; the minimum radius, if the said event message is not located in any defined areas; or, adding to the table: the point in metric space corresponding to the event message; and, the further radius; if the said event message is located in a plurality of the said defined areas.

The step of determining for each of the first plurality of event messages whether the said event message is located within any defined areas; may further comprise the step of flagging the said defined areas in the said determination.

The step of adding to the table; may further comprise the step of deleting from the table the: point in metric space; and, radius; associated with each flagged defined area.

The method may further comprise the step of re-running the method with a different minimum radius.

Embodiments of the present invention will now be described in detail with reference to the accompanying drawings, in which.

Figure 1:
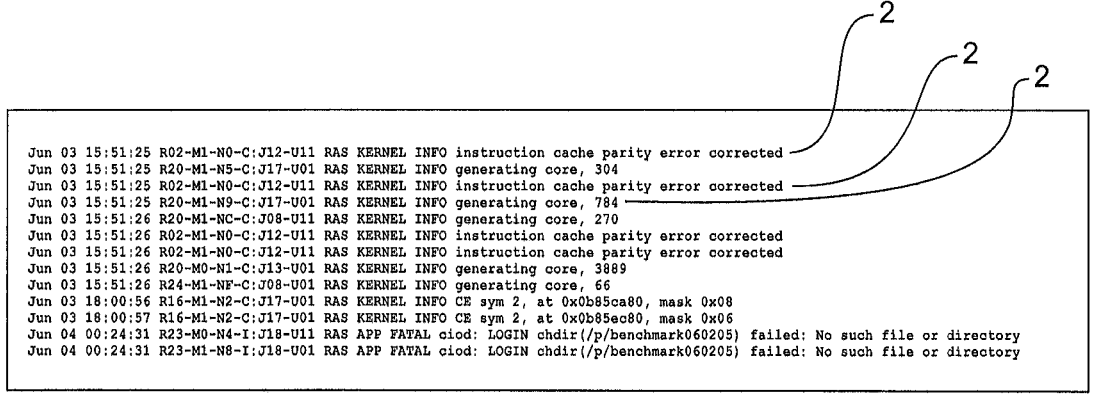
FIG. 1 shows event logs generated by a Lustre file system in an HPC environment.

The following methods are in the field of event log 2 clustering.

According to a first aspect there are provided methods for calculating a metric distance between a first character associated with a first computational event message 4, and a second character associated with a second computational event message 4. The said methods may be embodied in software or hardware.

According to a second aspect there are provided methods for calculating a distance in metric space between computational event messages 4. The said methods may be embodied in software or hardware. The methods of the second aspect may use any of the methods disclosed in the first aspect.

According to a third aspect there are provided methods for defining an area in metric space for clustering computational events. The said methods may be embodied in software or hardware. The methods of the third aspect may use any of the methods disclosed in the first and second aspects.

According to a fourth aspect there are provided methods of populating a table comprising a first plurality of data entries, wherein the methods provides a further data entry in the table associated with a further defined area in metric space as calculated by any of the methods disclosed in the third aspect.

Throughout all of the aspects described herein, the term "computational event message" is used interchangeably with the term "event message" or "message". Event messages 4 may be any computational event messages 4 but are preferably Syslog event messages 4.

It is also assumed herein throughout that event logs 2 and event messages 4 are read from left to right and any reference to any calculation or determination or other analysis of an event message 4 "in sequence" is intended to be in sequence from left to right.

Determining Character Metric Distances

Previous methods of determining distances between computational events in metric space have comprised determining the exact metric distance between sequentially corresponding characters in the two messages 4 being evaluated. Therefore, any difference between each of the said two characters being compared may contribute a non-zero metric distance between the two messages 4 and may complicate the determination of suitable event clusters 6 due to the likelihood that each event will be separated by a non-zero metric distance. This also gives rise to high computer processing requirements to make a clustering analysis.

The inventor of the present application has noticed that typically at least a portion of the information in the event log 2, or event message, is not required to be analysed to determine whether or not said messages 4 are similar to each other for error analysis, and thus should be in the same cluster. Event logs 2 are written by programmers and developers as debug messages 4. They typically include combinations of various technical parameters such as IP addresses, MAC addresses, process IDs etc. which are used by programmers and developers to help with their own debugging. Typically these technical parameters are formed from hexadecimal or decimal characters. Directly comparing two event messages 4 in metric space including the comparison of these parameters such as IP addresses and MAC addresses provides a significant computational burden upon the clustering analysis. Furthermore, it may give rise to metric distances that separate the events into different clusters 6 where the type of event message 4 is the same or similar. These parameters are unnecessary for establishing a cluster 6 of similar or identical event messages 4.

A method is provided for determining a metric distance in metric space whereby instead of only directly comparing a character in one event log to another character in another event log 2 to determine the character metric distance, the method compares each said character (also referred to as the first character and the second character) to a comparative set of characters. If both of the first and second characters comprise a character from the said comparative set, then the method outputs a first predefined metric distance and ignores any actual difference between the said characters. In this manner, the method may be seen to be operating in a pseudo-metric space.

For example, if the comparative set of characters contained the decimal numbers {0, 1, 2, 3, 4, 5, 6, 7, 8, 9} and the characters being compared between the two event messages 4 were the characters '3' for the first character and '6' for the second character, then the present method would output a predefined character metric distance (for example 0). In contrast, an existing method that determines character distances by taking the numerical distance between the decimal characters, may output a distance of 3 (taken from a calculation of 6−3), or a distance of 1 using Levenshtein distance (which provides a distance of 1, or in principle any other number, when the characters are different regardless of their values). Conversely following from this example, using the same comparative set and predefined character metric distance, if the first character was 1 and second character was 9, then the present method would output the same predefined metric distance of 0, whilst the existing method would output a character metric distance of 8 ((taken from a calculation of 9−1) or a distance of 1, or any other number, using Levenshtein distance.

Preferably this comparative set of characters is a partial set of characters from the range of different characters used to create the error log messages 4. Preferably, the set of characters chosen for the comparative set are those characters which commonly occur in parts of the event messages 4 that are not typically required in determining the similarity of event messages 4 for clustering. Preferably the method comprises a first predefined output of 0, This predefined output value, together with the choice of comparative characters, allows the method, when analysing all the characters in the log 2, to ignore metric distances that have no bearing on clustering events.

As described later, characters within an event message, or within a word of an event message, may be compared serially within the word or message 4 from left to right, although in principle, any pair of characters (one from the first message, one from the second message) from any of the words in the respective first and second messages 4, may be compared. For example, when comparing all the characters in a particular word in the first event message to corresponding characters in a particular word in the second event message, the first character (reading the word left to right) of the first word (reading the message 4 left to right) of the first event message, is compared to the corresponding first character (read the word left to right) of the first word (reading the message 4 left to right) of the second event message. Then, the second character (reading the word left to right) of the first word (reading the message 4 left to right) of the first event message is compared to the corresponding second character (reading the word left to right) of the first word (reading the message 4 left to right) of the second event message, and so on until either the first or second word has no corresponding character to be compared against.

Other terminology may be used to describe the comparison of the words and characters herein, including referring to the words being compared in the first and second messages 4 as the first and second words, and the characters being compared between two words as the first and second characters.

Another way of describing this is that the characters in the particular words of the first and second messages (when analysing on a word by word basis), or the characters in the message, are aligned or sequentially aligned.

If, once the characters are aligned, one or more of the words being compared has no corresponding aligned character, then these one or more characters of a particular word or message 4 are excess characters forming part of an excess character set.

In the same manner, as described in the second aspect, the words of two different messages 4 may also be 'aligned' (for example for evaluation purposes) so that the first word (when read left to right) of the first message is evaluated with the first word (when read left to right) of the second message, and so on.

An example of comparing aligned characters of words in two different messages 4 is given below. Here, a hexadecimal set of comparative characters is used together with a first predefined character metric distance of 0. The two following separate lines show two words in each of the messages 4:

"LOGIN 00b85" for the first message; and,

"FATAL 11e20" for the second message;

When each aligned character pair are compared to determine a character metric distance, a 0 character metric distance would be found between all the characters in the aligned words '00b85' and '01e80' because, for each aligned character pair, both the characters comprise a character from the comparative set. The only positive metric distances derived from this example would result from sequentially comparing the different characters between the aligned words LOGIN and FATAL, because, sequentially, at least one of the characters in each compared pair comprises a character not within the set.

Preferably, the comparative set of characters are the hexadecimal characters (A B C D E F, a b c d e f, 0 1 2 3 4 5 6 7 8 9), although in principle any set of characters may be chosen for the set. The reason for choosing these characters is that they are the characters that are commonly used to define MAC addresses, IP addresses and process IDs, all of which are irrelevant for clustering similar event messages 4.

Preferably, if both of the characters being compared are identical then, irrespective of whether or not they are one of the comparative set of characters, the method outputs the same first predefined value of metric distance. Again, preferably this distance is zero, although in principle it could be any value and may be a different predefined metric distance to the first predefined metric distance. This is because the goal of clustering using metrics is to only assign a positive integer metric distance between elements (words/characters) of a message 4 when the elements are different and relevant to distinguishing between different event types. If, for example the word is the same (hence comprising the same characters), then this is an indication that the event messages 4 share some similarity and therefore should be located nearby in metric space.

If all the characters in the first message are identical, when compared in sequence, to the characters in the second message, then the messages 4 are the same and should occupy the same point in metric space. Using the method as described herein, this situation of preferably having a zero metric distance between two events, may also occur when both the corresponding characters in the first and second message, when compared in sequence, are either:

A. Identical to each other but not identical to any of the characters in the comparative set; or B. Identical to each other and identical to any one of the characters in the comparative set; or C. Not identical to each other and wherein each of the first and second compared characters are identical to any one of the characters in the comparative set.

This example is assuming event messages 4 with identical numbers of words and identical length of aligned words.

This is shown in the following example using a hexadecimal set of comparative characters and a first predefined character metric distance of 0. The two following words in each of the messages 4 are as follows:

"FATAL 11b85" for the first message; and,
"FATAL 11e20" for the second message;

Each character metric distance between aligned characters is 0 because:

1) the sequentially compared characters: {T and T}, {L and L} from the first words in each respective message 4 are identical even though none of them are identical to any of the comparative sets; therefore have a character metric distance of 0 as defined in point A) above; and, 2) the sequentially compared characters: {F and F}, {A and A}, from the first words in each respective message; and {1 and 1} and {1 and 1} from the second words in each respective message; are identical and also comprise a character in the hexadecimal comparative character set; therefore have a character metric distance of 0 as defined in point B) above; and, 3) the sequentially compared characters: {A and 3} from the first words in each respective message, and {b and e}, {8 and 2}, {5 and 0} from the second words in each respective message; have both of the compared characters identical to at least one of the hexadecimal characters in the comparative set; therefore have a character metric distance of 0 as defined in point C) above.

If, however the two aligned characters in the different event logs 2 or event messages 4 are different, and at least one is not comprised within the comparative set of characters, the method outputs a different predefined metric distance (otherwise referred to in herein as a second predefined metric distance). The second predefined metric may take any value but is preferably a non-zero integer value. Preferably this metric distance is 1 or "unitary metric distance".

The characters used to create the two different event logs 2 or event messages 4 may in principle be chosen from two different originating sets of characters, however preferably, the comparative set of characters is both: a partial set of characters of the first set of characters used to create the first event message; and a partial set of characters of the second set of characters used to create the second event message.

A further example of how the method presented herein works in a pseudo-metric space is discussed below with regard to a common event message 4 word sequence "Kernel Error". Table 1 provides a list of word pairs (including "Kernel Error") that are similar to the word pair "Kernel Error". By using a hexadecimal comparative set, the method described herein, when comparing "Kernel Error" to any of the word pairs in table 1, would assign a 0 metric distance between each of the aligned characters, hence a 0 metric distance between "Kernel Error" and each of the similar aligned word pairs.

TABLE 1

Lists of words having a zero metric distance to the words 'Kernel Error'

| | | | | |
|---|---|---|---|---|
| Kernel Error | K2rnel Error | K0rnel Error | Kbrnbl Arror | K4rnel 3rror |
| Karnel Error | K3rnel Error | KArnol Error | Kcrncl Brror | K5rnel 4rror |
| Kbrnel Error | K4rnel Error | KBrnol Error | Kdrndl Crror | K6rnel 5rror |
| Kcrnel Error | K5rnel Error | KCrnel Error | Kernel Drror | K7rnel 6rror |
| Kdrnel Error | K6rnel Error | KDrnel Error | Kfrnfl Error | K8rnel 7rror |
| Kernel Error | K7rnel Error | KErnel Error | K1rnel Frror | K9rnel 8rror |
| Kfrnel Error | K8rnel Error | KFrnel Error | K2rnel Arror | K0rnel 9rror |
| K1rnel Error | K9rnel Error | Karnal Error | K3rnel Brror | KArnel 0rror |

However, in traditional methods for determining metric distances between event messages 4, these character differences between the different word pairs in table 1, when compared to the words "Kernel Error" will have the effect of assigning a non-zero metric distance between the word pairs, hence a non-zero metric distance between the event messages 4. The method presented herein therefore provides a fast and efficient way of providing a zero metric distance to similar words and messages 4 and therefore allows for grouping of messages 4 with similar error types but using different MAC addresses (for example). This method of using pseudo metric space comes with a risk of identifying two different events as a single event by setting a zero metric distance when characters of different messages 4 are different but both comprised within the comparative set. However as shown above in Table 1, for words such as "Kernel" that are misspelt to 'karnel', this can be an advantage because the event message 4 shouldn't have a metric distance, but would do so using a traditional metric method. Furthermore, the future development of error messages 4 using words such as "karnel 3rror", are extremely unlikely. This above described comparison between aligned characters and a comparative set is mathematically described below between two characters $A_i^h$ and $B_j^k$ as follows where the metric distance between two characters is '$d_C$'.

$$d_C(A_i^h, b_j^k) = \begin{cases} 0 & \forall A_i^h, \forall B_j^k \text{ with } A_i^h = B_j^k \\ 0 & \forall A_i^h, \forall B_j^k \text{ with } A_i^h \neq B_j^k \text{ and } A_i^h \in \mathbb{T}, B_j^k \in \mathbb{T} \\ 1 & \text{Otherwise} \end{cases} \quad \text{Equ. 4}$$

Here, $\mathbb{T}$ denotes the comparative set of characters, which is preferably the hexadecimal set of characters as mathematically noted in equation 4a.

$$\mathbb{T} \triangleq \{A,B,C,D,E,F,a,b,c,d,e,f,0,1,2,3,4,5,6,7,8,9\} \quad \text{Equ. 4a}$$

The method can be applied to an event message 4 extracted from an event log 2 or applied to all the characters in the event log 2 or any part of an event log. Preferably however the method is applied to an event message 4 extracted from an event log 2. When the said method is applied to multiple characters aligned between two different messages 4 being compared, a determination of the word metric distance can be established.

The character distance function $d_C$ defined in equation 4 is given for two characters A and B and is re-stated generically below in equation 5 where the three different outcomes are termed Case 1, Case 2 and Case 3. The above description providing the conditions required (i.e. what the characters are being compared) to give different character metric distance outputs are just an example of a method of determining dc.

$$d_C(A, B) = \begin{cases} 0 & \forall A, \forall B \text{ with } A = B & \text{Case 1} \\ 0 & \forall A, \forall B \text{ with } A \neq B \text{ and } A \in \mathbb{T}, B \in \mathbb{T} & \text{Case 2} \\ 1 & \text{Otherwise} & \text{Case 3} \end{cases} \quad \text{Equ. 5}$$

Equation 5 has three cases. In case 1, A and B are same regardless of whether they belong to the comparative set or not. In case 2, A and B are different but both belong to the comparative set. Case 3 described all other cases, i.e., at least one of A or B does not belong to the comparative set.

In the example of equation 5, the metric distance value for case 1 should be always zero because it is a fundamental property of metric mathematics that identical characters have no distance between them. The metric distance value for case 2 is also set to zero, but does not necessarily need to be zero and in principle can take any numerical value. Similarly, the metric distance value for case 3 is non-zero but does not necessarily need to be 1. In principle the output value for case 3 can be any value. Preferably the output value for case 3 is larger than the output value for case 2 as exemplified in the following two equations, 5a and 5b for character distance function dc.

$$d_C(A, B) = \quad \text{Equ. 5a}$$
$$\begin{cases} 0 & \forall A, \forall B \text{ with } A = B & \text{Case 1} \\ 0 & \forall A, \forall B \text{ with } A \neq B \text{ and } A \in \mathbb{T}, B \in \mathbb{T} & \text{Case 2} \\ 1000 & \text{Otherwise} & \text{Case 3} \end{cases}$$

$$d_C(A, B) = \quad \text{Equ. 5b}$$
$$\begin{cases} 0 & \forall A, \forall B \text{ with } A = B & \text{Case 1} \\ 0.00001 & \forall A, \forall B \text{ with } A \neq B \text{ and } A \in \mathbb{T}, B \in \mathbb{T} & \text{Case 2} \\ 1 & \text{Otherwise} & \text{Case 3} \end{cases}$$

In both of the above equations 5a and 5b, the distance value dc is zero for case 1. This metric distance may be termed the fundamental metric distance and preferably takes the value 0, although in principle it can be any value, preferably less than the values attributed to cases 2 and 3. The distance values 'dc' of cases 2 and 3 are different in each of equations 5a and 5b but are similar in that, for each instance, the numerical value for case 2 is negligible when compared to the distance value of case 3. If case 2 provides a non-zero value for dc, then the value of dc for case 3 is preferably at least 10 times greater than that of case 2, or preferably at least 100 times greater, or preferably at least 1000 times greater, or preferably at least 10,000 times greater, or preferably at least 100,000 times greater, or preferably at least 1000,000 times greater.

The distance is pseudo metric if it yields zero distance for some elements or characters which are not same. In equation 5, case 2 yields zero for some circumstances where A is not equal to B. Therefore, the distance function represented by equation 5 is pseudo-metric and its corresponding metric space will be pseudo-metric space. The distance functions represented by equations 5a and 5b always yield a non-zero value when A is not equal to B. Therefore, they are proper ('standard' or 'non-pseudo') distance functions and their corresponding metric spaces are proper metric spaces.

The above discussions illustrate that there are at least 3 character metric distance values, provided by the distance functions represented by the equations 5, 5a and 5b. One of the values is zero, another is zero or non-zero, and the other is a non-zero value. These can be termed a first, second and third value respectively. The second value is smaller, (preferably negligible when compared to) the third value.

In the above distance functions represented by equations 5, 5a and 5b, case 3 can be divided into one or more further cases depending on whether A and B are members of the comparative set. Preferably there are three further 3 subdivided cases. Equation 5c mathematically describes this scenario.

$$d_C(A, B) = \quad \text{Equ. 5c}$$
$$\begin{cases} 0 & \forall A, \forall B \text{ with } A = B & \text{Case 1} \\ 0 & \forall A, \forall B \text{ with } A \neq B \text{ and } A \in \mathbb{T}, B \in \mathbb{T} & \text{Case 2} \\ 1 & \forall A, \forall B \text{ with } A \neq B \text{ and } A \in \mathbb{T}, B \notin \mathbb{T} & \text{Case 3} \\ 1 & \forall A, \forall B \text{ with } A \neq B \text{ and } A \notin \mathbb{T}, B \in \mathbb{T} & \text{Case 4} \\ 1 & \forall A, \forall B \text{ with } A \neq B \text{ and } A \notin \mathbb{T}, B \notin \mathbb{T} & \text{Case 5} \end{cases}$$

The above distance function, represented by equation 5c, is exactly same as the distance function represented in equation 5 but expanded out to show three cases (case 3, case 4 and case 5) that represent different instances where A and B are either part of the comparative set or not. Case 1 and case 2 remain exactly same as before but case 3, 4 and 5 can be treated differently.

Cases 3 and 4 represent the same scenario where one character element (A or B) belongs to the comparative set and the other does not. Preferably, both case 3 and case 4 yield non-zero values. These non-zero values may be identical or different. Preferably, case 3 and case 4 should also yield values which are significantly greater than values yielded by case 2 as described above.

Case 5 corresponds to the case where both A and B do not belong to the comparative set. This case should yield the highest value because the contribution of these character distance value to the final event distance value will be high and subsequently push dissimilar event messages further apart. The values of cases 3, 4 and 5 in equations 5c-5g may be termed first, second and third values, where the third value represents case 5, whilst each of the first and second values may represent one of cases 3 or 4.

Equations 5d-5g show some further examples.

The distance function represented by equation 5d provides: a zero for case 1; a zero for case 2; identical non-zero outputs (in this example the value 1) for case 3 (where A and B are different but A belongs to the comparative set and B does not) and case 4 (where A and B are different 5. but B belongs to the comparative set and A does not); and a non-zero output (in this example 100) for case 5 (where A and B are different and neither belong to the comparative set).

$$d_C(A, B) = \begin{cases} 0 & \forall A, \forall B \text{ with } A = B & \text{Case 1} \\ 0 & \forall A, \forall B \text{ with } A \neq B \text{ and } A \in \mathbb{T}, B \in \mathbb{T} & \text{Case 2} \\ 1 & \forall A, \forall B \text{ with } A \neq B \text{ and } A \in \mathbb{T}, B \notin \mathbb{T} & \text{Case 3} \\ 1 & \forall A, \forall B \text{ with } A \neq B \text{ and } A \notin \mathbb{T}, B \in \mathbb{T} & \text{Case 4} \\ 100 & \forall A, \forall B \text{ with } A \neq B \text{ and } A \notin \mathbb{T}, B \notin \mathbb{T} & \text{Case 5} \end{cases} \quad \text{Equ. 5d}$$

The distance function represented by equation 5e provides: a zero for case 1; a zero for case 2; non-identical non-zero outputs (in this example the respective values 2 and 3) for case 3 (where A and B are different but A belongs to the comparative set and B does not) and case 4 (where A and B are different but B belongs to the comparative set and A does not); and a non-zero output (in this example 100) for case 5 (where A and B are different and neither belong to the comparative set).

$$d_C(A, B) = \begin{cases} 0 & \forall A, \forall B \text{ with } A = B & \text{Case 1} \\ 0 & \forall A, \forall B \text{ with } A \neq B \text{ and } A \in \mathbb{T}, B \in \mathbb{T} & \text{Case 2} \\ 2 & \forall A, \forall B \text{ with } A \neq B \text{ and } A \in \mathbb{T}, B \notin \mathbb{T} & \text{Case 3} \\ 3 & \forall A, \forall B \text{ with } A \neq B \text{ and } A \notin \mathbb{T}, B \in \mathbb{T} & \text{Case 4} \\ 100 & \forall A, \forall B \text{ with } A \neq B \text{ and } A \notin \mathbb{T}, B \notin \mathbb{T} & \text{Case 5} \end{cases} \quad \text{Equ. 5e}$$

The distance function represented by equation 5f provides: a zero for case 1; a non-zero value for case 2 (in this example the value 1); non-identical non-zero outputs (in this example the respective values 23 and 42) for case 3 (where A and B are different but A belongs to the comparative set and B does not) and case 4 (where A and B are different but B belongs to the comparative set and A does not); and a non-zero output (in this example 1000) for case 5 (where A and B are different and neither belong to the comparative set).

$$d_C(A, B) = \begin{cases} 0 & \forall A, \forall B \text{ with } A = B & \text{Case 1} \\ 0 & \forall A, \forall B \text{ with } A \neq B \text{ and } A \in \mathbb{T}, B \in \mathbb{T} & \text{Case 2} \\ 23 & \forall A, \forall B \text{ with } A \neq B \text{ and } A \in \mathbb{T}, B \notin \mathbb{T} & \text{Case 3} \\ 42 & \forall A, \forall B \text{ with } A \neq B \text{ and } A \notin \mathbb{T}, B \in \mathbb{T} & \text{Case 4} \\ 1000 & \forall A, \forall B \text{ with } A \neq B \text{ and } A \notin \mathbb{T}, B \notin \mathbb{T} & \text{Case 5} \end{cases} \quad \text{Equ. 5f}$$

The distance function represented by equation 5g provides: a zero for case 1; a non-zero value for case 2 (in this example the value 0.0001); identical non-zero outputs (in this example the value 1) for case 3 (where A and B are different but A belongs to the comparative set and B does not) and case 4 (where A and B are different but B belongs to the comparative set and A does not); and a non-zero output (in this example 10) for case 5 (where A and B are different and neither belong to the comparative set).

$$d_C(A, B) = \begin{cases} 0 & \forall A, \forall B \text{ with } A = B & \text{Case 1} \\ 0.0001 & \forall A, \forall B \text{ with } A \neq B \text{ and } A \in \mathbb{T}, B \in \mathbb{T} & \text{Case 2} \\ 1 & \forall A, \forall B \text{ with } A \neq B \text{ and } A \in \mathbb{T}, B \notin \mathbb{T} & \text{Case 3} \\ 1 & \forall A, \forall B \text{ with } A \neq B \text{ and } A \notin \mathbb{T}, B \in \mathbb{T} & \text{Case 4} \\ 10 & \forall A, \forall B \text{ with } A \neq B \text{ and } A \notin \mathbb{T}, B \notin \mathbb{T} & \text{Case 5} \end{cases} \quad \text{Equ. 5g}$$

Determining Event Metric Distances

In the second aspect, a distance function for event messages 4 is defined.

An event message 4 is typically a string of characters. It is typically a sequence of words separated by word-separators. White space is a typical word separator but other characters such as colon (:), hyphen (-), etc., can also be treated as word separators depending on the context. When the word separators in an event message 4 'A' are ignored, it can be represented as follows:

$$A \triangleq A_0 A_1 A_2 \ldots A_i \ldots A_{N_A} \quad \text{Equ. 6}$$

where $A_{N_A}$ represents the last and $A_i$ for $0 \leq i \leq N_A$ represent the $i^{th}$ word of the event message 4 A.

A word is a sequence of characters. The $i^{th}$ word of the event A can be represented as follows:

$$A_i \triangleq A_i^0 A_i^1 A_i^2 \ldots A_i^j \ldots A_i^{M_{(A_i)}} \quad \text{Equ. 7}$$

where $M_{(A_i)}$ represents the last character of the word $A_i$ and $A_i^j$ for $0 \leq j \leq M_{(A_i)}$ represent the $j^{th}$ character of the $i^{th}$ word of the event message A.

The method presented in the second aspect calculates a distance in metric space between computational event messages 4.

The event messages 4 being compared are referred to as a first event message (for example message A) and a second event message (for example message B). The first event message is associated with a first event log 2 and comprises a first word sequence of one or more computational words. Each of the said one or more computational words comprises a sequence of one or more characters.

Similarly, the second event message is associated with a second event log. The second event message comprises a second word sequence of one or more computational words. Each of the said one or more computational words comprises a sequence of one or more characters.

The method determines the metric distance between event messages 4 by determining the metric distance between aligned words in the first and second message. For example, if both message A and message B have three words each, then the method calculates the metric distances between words: $\{A_1 \text{ to } B_1\}$, $\{A_2 \text{ to } B_2\}$, $\{A_3 \text{ to } B_3\}$.

In an example, if:
  message A has 3 words {KERNEL ERROR FATAL}, whilst,
  message B has 2 words {KERNEL STACKS};

then the method calculates the metric distances between words: {$A_1$ to $B_1$}, {$A_2$ to $B_2$}, i.e. {KERNEL to KERNEL}, {ERROR to STACKS}. In this example, the word $A_3$ (FATAL) is not compared to another word because there is no corresponding word $B_3$ in the word sequence of message B. The un-aligned words in a word sequence are preferably assigned a non-zero positive metric numeric value, although in principle they may be ignored. Preferably a word weight is assigned to un-aligned words as described herein.

The metric distance between the two messages A and B is then determined, at least partially, based upon the summation of the above said word metric distances. In the example above, the event metric distance is at least partially determined by adding the word metric distance of {KERNEL to KERNEL}, to the word metric distance of {ERROR to STACKS}. The absolute message metric distance may also be determined, additionally, by one or more other factors, such as, but not limited to, word weights for un-aligned words as discussed below.

The distance between each aligned word pair is determined at least partially, by summing the distances between the aligned characters in the said word pair. For example, word $A_2$, in message A, has characters $A_2^1, A_2^2, A_2^3$, whilst word $B_2$, in message B, has characters $B_2^1, B_2^2, B_2^3, B_2^4$. The aligned character pair distances are therefore the metric distances between: {$A_2^1$ and $B_2^1$}, {$A_2^2$ and $B_2^2$}, {$A_2^3$ and $B_2^3$}. The character $B_2^4$ is an excess un-aligned character when compared to the character sequence in word $A_2$ because it has no corresponding aligned character to compare against.

The metric distance between the characters can be determined by any suitable method, including, but not limited to the methods disclosed in the first aspect described herein.

Following through the example above where:
message A has 3 words {KERNEL ERROR FATAL}, whilst,
message B has 2 words {KERNEL STACKS};
the method according to the second aspect, using the method of determining character metric distances of the first aspect (with a hexadecimal comparative set and a first predefined distance of 0 and a second predefined distance of 1) would base the event metric distance at least partially upon the following:

1. The word metric distance $d_{W1}$ of {KERNEL to KERNEL}. This would be 0 because all of the aligned characters {K to K} {E to E} {R to R} {N to N} {E to E} {L to L} are identical, therefore each outputting a character metric distance of 0. The summation of all the character metric distances in the first aligned words total to 0.
2. The word metric distance $d_{W2}$ of {ERROR to STACKS}. This would result in a value of 5 because each of the aligned characters {E to S} {R to T} {R to A} {O to C} {R to K} have non identical characters in each aligned pair.

Thus the summation of the word metric distances in this example would be $d_{E(A-B)}=0+5=5$. Here we are assuming that the last character 'S' in 'STACKS' has no contribution to the metric distance.

The method according to the second aspect may also account for situations where the number of words in the message 4 being compared are non-identical, for example message A containing 8 words and message B containing 4 words where the excess number of un-aligned words in message A is 4. Preferably, the method assigns a numeric value to each and every word in the longest message 4 that is in excess of the last word in the shorter message 4 when the words in the messages 4 are aligned. This numeric value may be termed a 'weight' or 'word weight'. The method preferably determines the event metric distance from the summation of the aligned word metric distances as described above and the summation of each of the word weights.

For example if the number of words in message A is $N_A$ and the number of words in message B is $N_B$ then if $N_A<N_B$ then each of the words in $N_B$ in excess of $N_A$ is assigned a corresponding word weight w(B). Similarly, if $N_A>N_B$ then each of the words in $N_A$ in excess of $N_B$ is assigned a corresponding word weight w(A).

Mathematically, the distance $d_E$ between two events A and B taking into account word weights can be defined as follows:

$$d_E(A, B) = \begin{cases} \sum_{i=0}^{N_A} d_W(A_i, B_i) + \sum_{i=N_A+1}^{N_B} w(B_i) & N_A < N_B \\ \sum_{i=0}^{N_A} d_W(A_i, B_i) & N_A = N_B \\ \sum_{i=0}^{N_B} d_W(A_i, B_i) + \sum_{i=N_B+1}^{N_A} w(A_i) & N_A > N_B \end{cases} \quad \text{Equ. 8}$$

Here $w(A_i)$ and $w(B_i)$ denote the weights of the $i^{th}$ word in events A and B respectively, and $d_w(A_i, B_i)$ denotes the distance between the $i^{th}$ words in events A and B. Term $d_E$ is defined as the summation of word-wise distances and weights and can also be defined as follows:

$$d_E(A, B) = \sum_{k=0}^{min(N_A, N_B)} d_W(A_i, B_i) + \sum_{k=min(N_A, N_B)+1}^{max(N_A, N_B)} w(C_i) \quad \text{Equ. 9}$$

Where:

$$C_i = \begin{cases} A_i & N_A > N_B \\ B_i & \text{Otherwise} \end{cases}$$

The numeric value or 'word weight' given to the excess words may in principle be any value. Preferably, the second aspect determines the word weights based upon the number of characters in the word where the weight $w(X_i)$ of a word $X_i$ in event message X, is defined as the number of characters in that word. Therefore we have the following, where M is the last character:

$$w(X_i) = 1 + M_{(X_i)} \quad \text{Equ. 10}$$

It is noted in Equation 10 that the numeral '1' is added to '$M_{(Xi)}$' due to the computational notation of indexing from 0 instead of 1.

Similarly to calculate the event message distance $d_E$ using aligned word metric distances, and additionally, word weights when the number of words in each message 4 are non-identical; the metric distance $d_W$ between any two words $A_i$ and $B_j$ may further utilise a value associated with the number of excess characters the longest word (in the aligned word pair) has over and above the last aligned character in the corresponding shortest word. This value is preferably the absolute numerical difference (i.e. the modulus of the difference) between the number of characters in the aligned words.

For example when calculating the word metric distance $d_{C2}$ of {ERROR to STACKS} as described above, STACKS has 6 characters whilst ERROR has 5 characters. The absolute (modulus) difference between the number of characters in the strings is |5−6|=1. Preferably, this extra value is added to the summation of the aligned character metric distances between the two words, i.e. the characters {E to S} {R to T} {R to A} {O to C} {R to K}. Using the method of determining character metric distances of the first aspect (with a hexadecimal comparative set and a first predefined distance of 0 and a second predefined distance of 1) would give the word metric distance between ERROR and STACKS the metric value of 6 (5 units of metric distance arising from the aligned character pairs and 1 unit of metric distance arising from the excess un-aligned character 'S' from the word STACKS).

Mathematically this can be defined as follows:

$$d_W(A_i, B_j) = \begin{cases} \sum_{k=0}^{M_{(A_i)}} d_C(A_i^k, B_j^k) + M_{(B_j)} - M_{(A_i)} & M_{(A_i)} < M_{(B_j)} \\ \sum_{k=0}^{M_{(A_i)}} d_C(A_i^k, B_j^k) & M_{(A_i)} = M_{(B_j)} \\ \sum_{k=0}^{M_{(A_i)}} d_C(A_i^k, B_j^k) + M_{(A_i)} - M_{(B_j)} & M_{(A_i)} > M_{(B_j)} \end{cases} \quad \text{Equ. 11}$$

Here $d_C(A_i^k, B_j^k)$ denotes the distance between the characters $A_i^k$ and $B_j^k$. Again, $d_C$ is defined as the summation of character-wise distances and weights and can also be written as follows:

$$d_W(A_i, B_j) = |M_{(A_i)}, M_{(B_j)}| + \sum_{k=0}^{\min(M_{(A_i)}, M_{(B_j)})} d_C(A_i^k, B_j^k) \quad \text{Equ. 12}$$

Preferably, the method according to the second aspect uses the method mathematically corresponding to all of equations 8 (hence 9), 10 and 11 (hence 12).

Clustering Event Messages

According to a third aspect, there are provided methods and associated software and hardware for defining an area in metric space for clustering computational event messages 4.

Preferably, the method provides for finding a finite minimal cover for the event metric space with a number of pair-wise disjoint metric balls 8 of varying centre points and allowing for varying radii 30. Mathematically, for the event metric space M we need to find N collectively exhaustive and mutually exclusive metric balls 8. Mathematically this is denoted as:

$$B(R_i, X_i) \text{ for } 0 \leq i < N \text{ where } i \in \mathbb{N} \quad \text{Equ. 13}$$

for which the following two equations are satisfied:

$$\bigcup_{i=0}^{N-1} B(R_i, X_i) = M \text{ where } R_i \geq 0 \text{ and } X_i \in M \quad \text{Equ. 14}$$

$$B(R_i, X_i) \cap B(R_j, X_j) = \emptyset \text{ for } i \neq j \quad \text{Equ. 15}$$

Subsequently the problem reduces to finding $X_i$ and $R_i$ in the event metric space.

Figure 2:
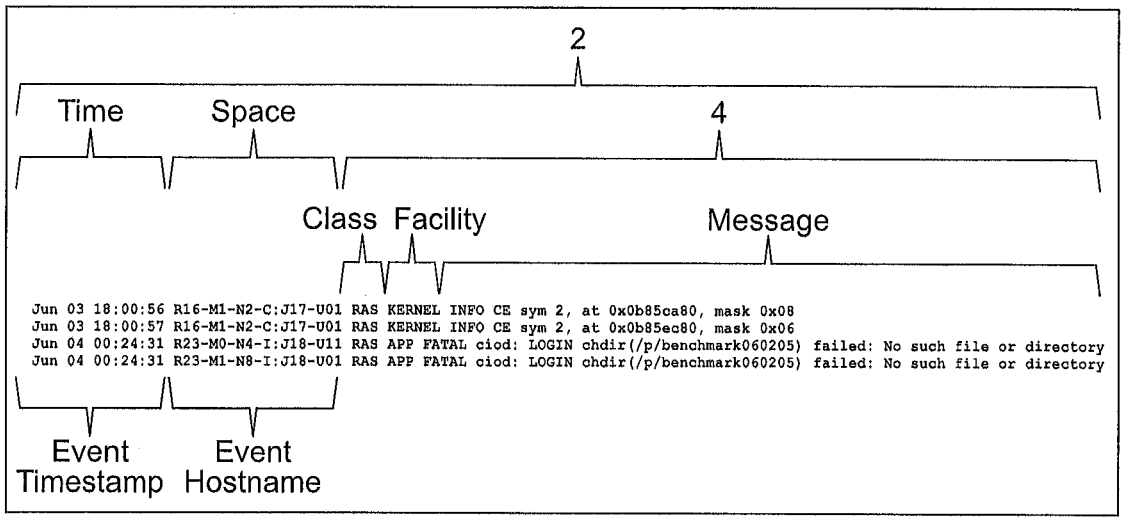
FIG. 2 shows the last four event logs of FIG. 1 together with an indication of different fields within the event logs.

The method according to the third aspect, defines an area in metric space for clustering computational event messages 4. The event logs 2 are preferably taken from a list of event logs 2 (hence event messages 4) such as shown in FIGS. 1 and 2. Preferably the method sequentially analyses each log 2 in sequence, from the top of the list to the bottom of the list, when clustering messages 4.

The method takes a first plurality of existing clusters 6. At least two of the said existing clusters 6 overlap in at least one overlap region 24 in metric space. For purposes of clarity, the 'overlap region 24' is the region of metric space where clusters 6 overlap; whilst the overlapping clusters 6 or overlapping areas (or overlapping defined areas) refer to the existing areas in metric space (for example existing metric balls 8) that partially overlap with one another giving rise to the overlap region. The existing clusters 6 are preferably those already determined or created from a cluster analysis of a first plurality of event messages 4. Preferably the said first plurality of event messages 4 comprises part of the list of event messages 4 in the said list of logs 2.

Preferably the first plurality of event messages 4 comprises the event message 4 starting at the top of the list and subsequently each further event message 4 in sequence down the list up down to the $Y^{th}$ event message 4 on the list where Y is the number of messages 4 in the first plurality of event messages 4.

Figure 3:
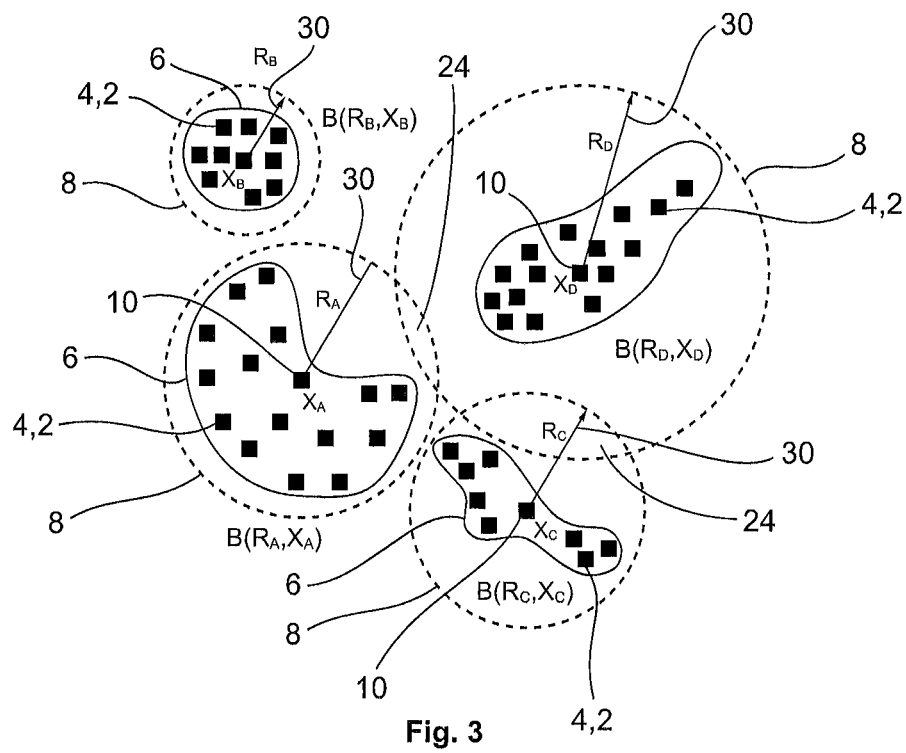
FIG. 3 shows the event log clusters with metric balls.

The existing clusters 6 are defined areas in metric space that contain one or more event messages 4. FIG. 3 shows an example of a geometrical representation of a first plurality of event messages 4 divided into four clusters A, B, C, D. Each of the said first plurality of event messages 4 is located within one of the plurality of clusters 6 (defined areas).

Preferably, as shown in FIG. 3, each existing cluster 6 is defined by a metric ball 8 centred about a central event message 10 with a radius R. In FIG. 3 it is shown that two overlap regions 24 exist: one overlap region 24 between metric balls A and D, and another between metric balls C and D.

The method then examines an event that has not already been analysed for incorporation into a cluster 6 (i.e. a new event or a further event) and analyses if the event is within any of the overlap regions 24. Preferably the further event message 26 is one of the event messages 4 in the list of logs 2. Preferably the further event message 26 is the event message 4 immediately following the last of the first plurality of event messages 4 in the list that have already been analysed for incorporation into a cluster.

If the further event message 26 is determined to reside within an overlap region, then the method creates a further cluster 6 (defined area). The further cluster 6 comprises a metric area comprising the further event message 26 and the event messages 4 originally comprised within the existing clusters 6 creating the said overlap region. Preferably, the method deletes the existing clusters 6 that defined the overlap region 24 at any time after the determination is made that the further event message 26 resides within the overlap region.

Figure 4A:
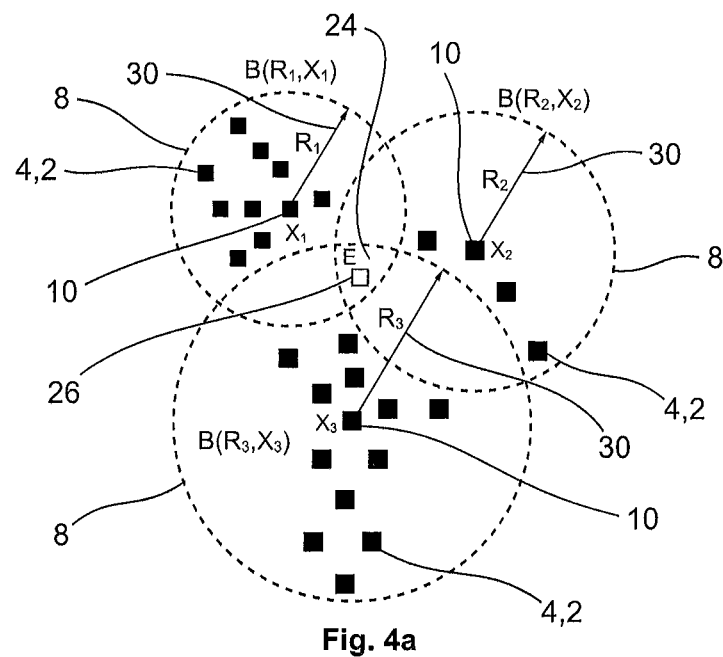
FIG. 4a shows an original set of pair-wise disjoint metric ball clusters.
Figure 4B:
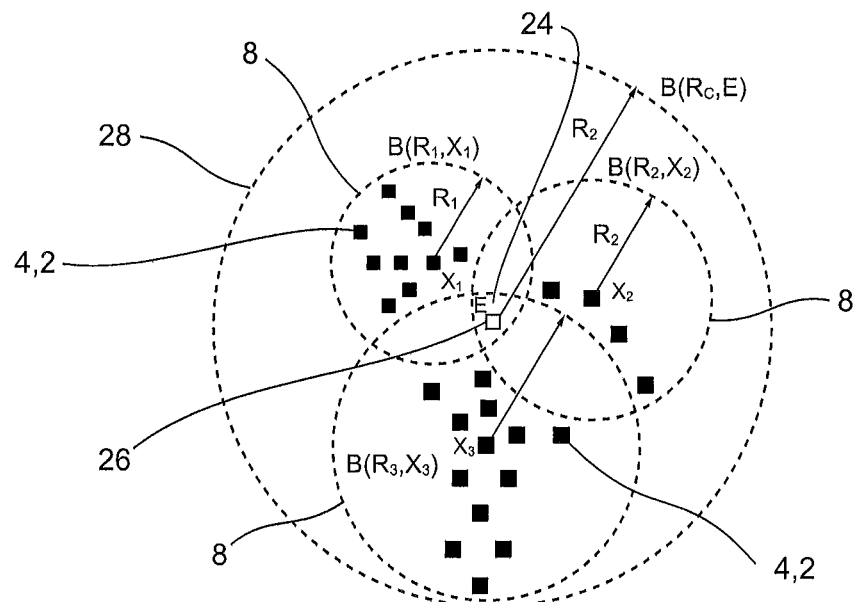
FIG. 4b shows the clusters of FIG. 4a together with a consolidated metric ball cluster.

FIG. 4a shows an example of this method whereby three existing clusters 6 are represented by three metric balls 8 {$B_1, B_2, B_3$} with respective radii 30 {$R_1, R_2, R_3$} and centre event messages {$X_1, X_2, X_3$}. As shown in FIG. 4a, a new (further) event 'E' is found in the overlap region 24 defined by the said three existing metric balls 8. FIG. 4b shows a new further defined area in the form of a further metric ball 8, 28 that encompasses all of the first plurality of event messages 4 and the further event message 'E'. The further metric ball 8, 28 is also known as a consolidated metric ball

Figure 4C:
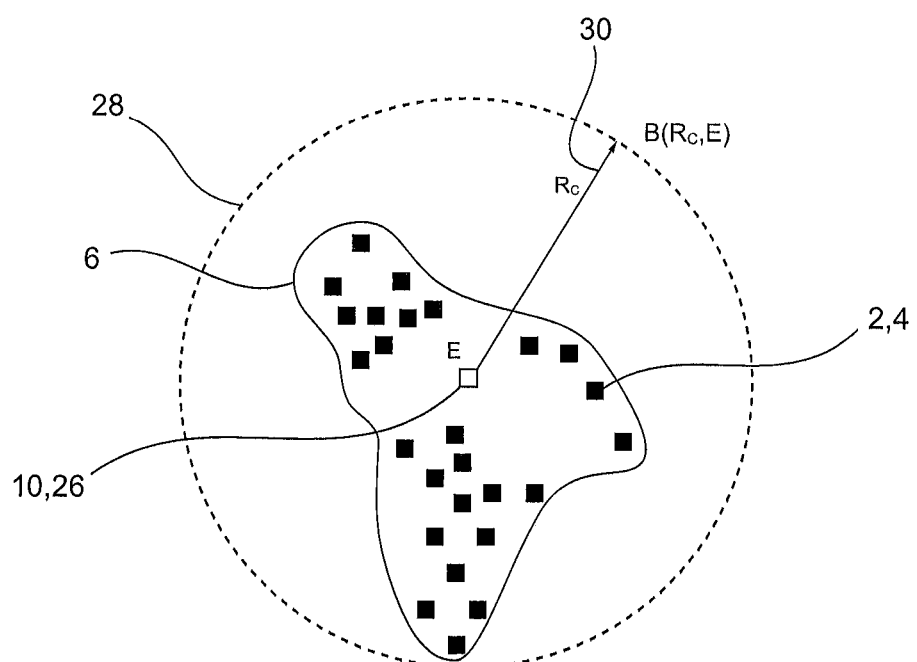
FIG. 4c shows the events of the original clusters together with the consolidated ball of FIG. 4b, wherein the original metric balls are deleted.

8, 28 and has a radius $R_C$ and centre point 'E'. FIG. 4c then shows the deletion of the existing metric balls 8 {$B_1$, $B_2$, $B_3$}.

Preferably the further event message 'E' is determined to be within an overlap region 24 by examining the metric distances, for each of the first plurality of existing defined areas (clusters 6), $d_E$, between the further event message E; and the said central event message 10 of the existing defined areas.

The said distances, $d_E$, are compared to the respective metric ball radii 30 associated with the said central event message 10. If at least two of the said comparisons determine that the further event message E is covered by the associated metric ball, then the further event message E is determined to be within the overlap region.

If using closed metric balls 8, the distance must be smaller than the radius 30 of the ball. If using open metric balls 8 the distance must be smaller than or equal to the radius 30.

All of the existing clusters 6 that contribute to the overlap region 24 are flagged so that the area covered by the further defined area can be suitably large to cover all of the event messages 4 originally covered by the metric balls 8 contributing to the overlap region.

In FIG. 4, for example, three metric distances ($d_{E1}$, $d_{E3}$, $d_{E3}$) would be respectively calculated between:
1. The central event message $X_1$, of metric ball $B_1$; and further event message E.
2. The central event message $X_2$, of metric ball $B_2$; and further event message E.
3. The central event message $X_3$, of metric ball $B_3$; and further event message E.

The determination would then be made whether at least two of the said distances were either smaller than (for a closed metric ball); or smaller than or equal to (for an open ball); the respective radii 30 associated with the metric ball 8 used to determine the said distance. Thus, for example using a closed ball 8 representation, whether:
1. $d_{E1} < R_1$
2. $d_{E2} < R_2$
3. $d_{E3} < R_3$ In FIG. 4, all the event metric distances ($d_{E1}$, $d_{E3}$, $d_{E3}$) are smaller than the respective radii 30, thus the consolidated metric ball 8, 28 is formed with further central event message E and radius $R_C$ that covers all of the events in the original three metric ball 8 clusters as well as the new event E.

Preferably the distance between the central event message 10 of an existing metric ball 8 and the further event message 26, is calculated using the method according to the second aspect as described herein, although in principle, any suitable event metric distance determining method could be used.

Preferably the new radius $R_C$ of the consolidated metric ball 8, 28 is determined by calculating a summation value, for each of the overlapping existing metric balls 8. Each summation value is the numeric value of the radius 30 for that existing metric ball 8 added to the respective distance between the further event message 26 and the central event message 10 for the said metric ball.

For example, in FIG. 4a, the summation value for metric ball $B_1$, is $d_{E1} + R_1$; the summation value for metric ball $B_2$ is $d_{E2} + R_2$; the summation value for metric ball $B_3$ is $d_{E3} + R_3$.

The method then selects the largest of the summation values and provides the further radius 30 based on the largest summation value. Preferably, the further radius 30 is the selected summation value. For the example shown in FIG. 4b, the summation value is that associated with existing metric ball $B_3$. Using this method of setting the radius 30 for the consolidated metric ball 8, 28 makes sure that all the event messages 4 previously covered by the existing metric balls 8 contributing to the overlap region 24 are included in the consolidated metric ball 8, 28.

Mathematically, the consolidated metric ball 8, 28 can be created as follows. Let E be the extracted event and let $B(R_i, X_i)$ for $1 \leq i \leq p$ where $p \geq 2$ represent all the metric balls 8 flagged in this instance. Then the consolidated metric ball 8, 28 is represented by $B(R_c, E)$ where $R_c = \max\{R_i + d_E(X_i, E) \ \forall i$ where $1 \leq i \leq p\}$.

Figure 5:
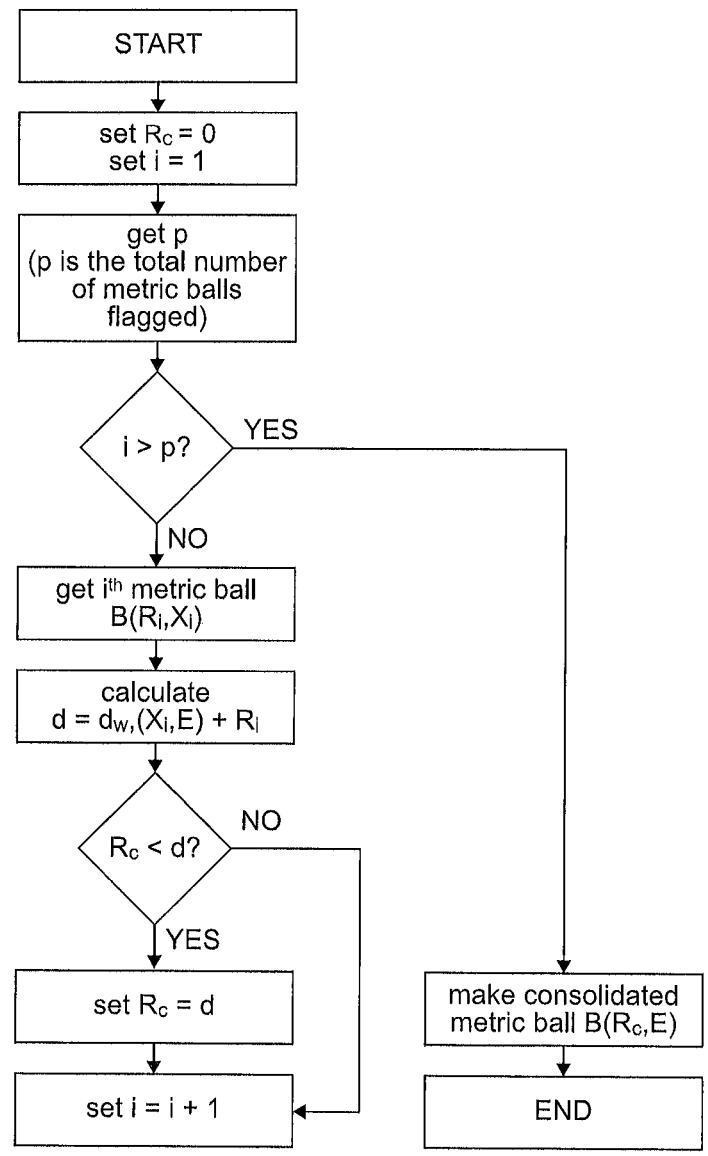
FIG. 5 shows a flow chart for the processes of creating a consolidated metric ball.

FIG. 5 shows an example of a flow chart for determining the consolidated metric ball 8, 28 radius 30 as described above.

The method according to the flow chart of FIG. 5 may be amended or modified in any suitable way according to the methods described in the first, second and third aspects.

FIG. 5 firstly starts by setting $R_c = 0$, and also setting i=1. The total number of metric balls 8 flagged, p, is obtained.

A first determination is then made as to whether 'i' is greater than p, (i>p?). If the answer to the first determination is yes then the method according to the flow chart of FIG. 5 then makes a consolidated metric ball $B(R_c, E)$. After this the method according to the flow chart of FIG. 5 comes to an end.

If however upon the determination of whether i>p, the answer is no, then the method proceeds by getting the $i^{th}$ metric ball $B(R_i, X_i)$. After this step, a metric distance d is calculated which is equal to $d_w(X_i, E) + R_i$.

After this calculation there proceeds a second determination step determining whether $R_c < d$.

If the answer is yes, then $R_c$ is set to be equal to d. The next step then sets 'i' equal to 'i+1'.

If the answer to this second determination ($R_c < d$?) is no then the setting of $R_c = d$ is ignored and the method simply proceeds to the setting of 'i=i+1'.

After the setting of 'i=i+1', the method then further proceeds by going back to the first determination step of determining whether or not i>p.

Preferably the clusters 6 are defined in a table where each new defined area (cluster) is inserted into the table beneath (or following) the last cluster entry in the table. The table may be initially populated or unpopulated.

Event Table

In a fourth aspect, methods are presented for populating a table. The table comprises a first plurality of data entries. Each of the first plurality of data entries is associated with a defined area in metric space (i.e. a cluster) and at least one of a first plurality of computational event messages 4. Each of the said first plurality of clusters 6 that have associated data entries in the table, may comprise a metric space covering one or more of the first plurality of event messages 4. The method inserts a first further data entry in the table, the first further data entry is associated with a further defined area (cluster) in metric space as described in the third aspect described herein.

Preferably the first plurality of data entries and the first further data entry are associated with any one or more of, a radius 30, or a point in metric space, corresponding to a central event message 10. Each central event message 10 corresponds to one of the first plurality of event messages 4.

Preferably, each of the first plurality of data entries in the table corresponds to a different point in metric space corresponding to a different central event message 10 specific for that cluster. Preferably the table comprises a second plurality of data entries, each corresponding to a different specific data entry comprised from the first plurality of data entries. Each of the second plurality of data entries comprises a radius 30. That radius 30 (being one of the second plurality of data entries) is preferably the radius 30 of the metric ball 8 defining the cluster 6 where the corresponding central event message 10 (being one of the first plurality of data entries) is the centre point of the metric ball.

Similarly, the first further data entry and second further data entries inserted into the table, likewise respectively correspond to the central event message 10 of the consolidated metric ball 8, 28 (i.e. the further metric coordinates of the further message) and the radius 30 of the consolidated metric ball 8, 28. In other words, when a consolidated metric ball 8, 28 is formed, the method inserts both the data relating to the metric coordinates of the further event message 26 and the radius 30 of the consolidated metric ball 8, 28 (i.e. the further defined area). Preferably these 'further' data entries are a further set that are inserted after the last set of data entries present in the table that relate to an existing cluster.

Figure 6:
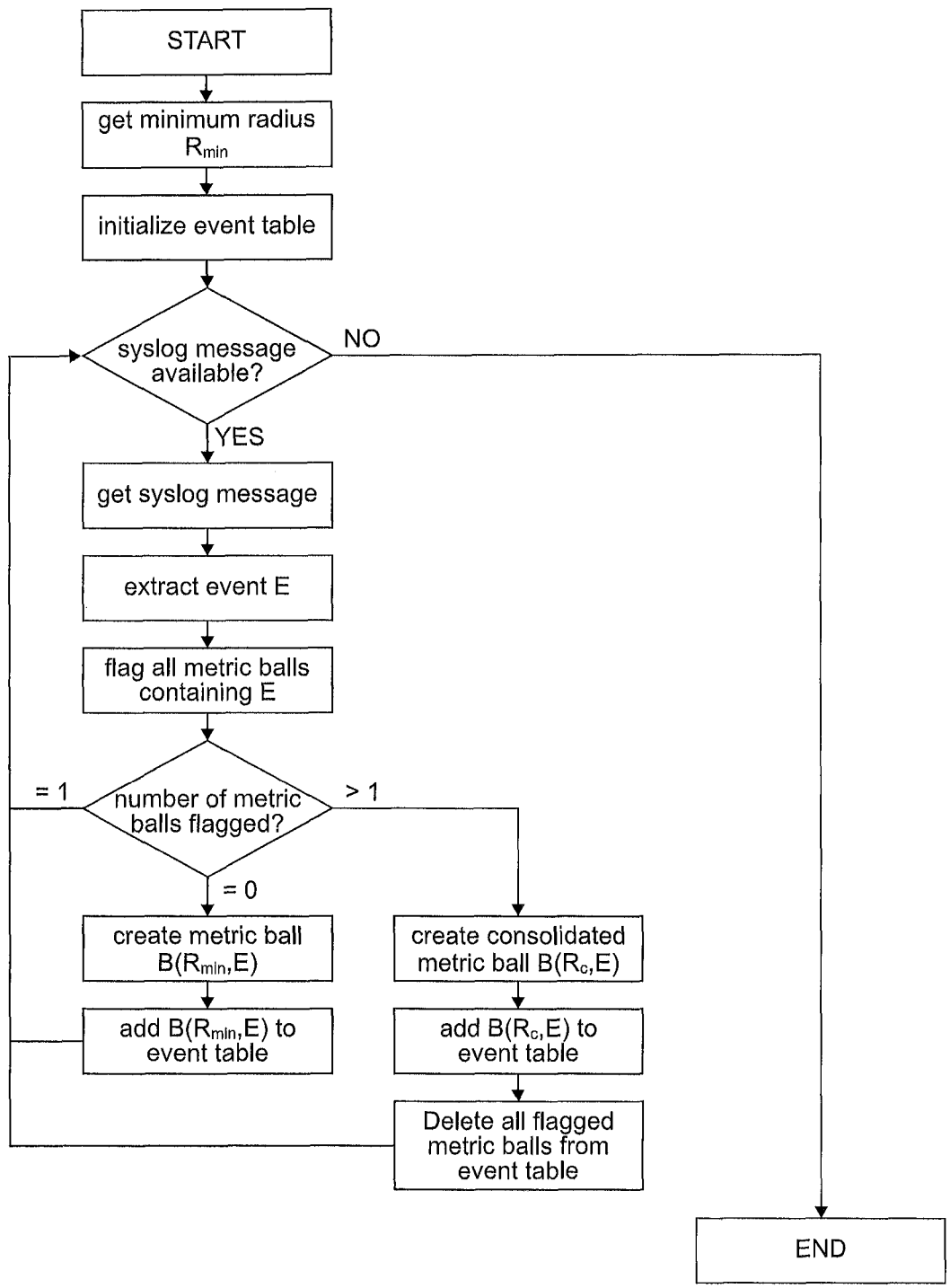
FIG. 6 shows a flow chart corresponding to the construction of an event table.

FIG. 6 shows an example of the method steps involved in creating an event table for storing the said data entries described herein.

Firstly an initial minimum radius $R_{MIN}$ is set. This defines the default radius 30 that new metric ball 8 clusters are assigned with.

An event table is then initialised. In principle, the table could be initialised at any time before the assigning of the minimum radius 30 up to the requirement to insert a data entry into the table.

The method determines whether or not a message 4 (for example, but not limited to a syslog event message) is available to be analysed. If there are no messages 4 to be analysed, the method ends. If there are event messages 4 to be analysed (typically by sequentially analysing a list of error logs 2) then the new message (also known as the further message) 'E' is retrieved and the message 4 is extracted from the log.

Using methods described herein, all the metric balls 8 that cover E are identified and flagged. When the first message in the cluster analysis is analysed, there typically will be no existing metric balls 8 represented in the table and therefore the first message will not correspond to any existing metric balls 8. If only one ball 8 is flagged then the new message E is allocated to that existing metric ball 8 and the method goes back to obtaining and analysing the next new message log 2.

If no metric balls 8 are flagged then then new event 'E' does not fall within the coverage of any existing metric balls 8 and is used to create a new metric ball 'B' with the minimum radius 30, whereby the entries in the table for the metric ball 8 correspond to the said minimum radius 30 and the event message '$B(R_{MIN}, E)$' (the event message 4 in this instance being assigned as the central event message 10). Once the new metric ball 8 is formed, the method adds $B(R_{MIN}, E)$ to the event table and then checks to see if any new event logs 2 are to be analysed again.

If more than one event message 4 is flagged then the new message 'E' is covered by a plurality of existing metric balls 8 in an overlap region. A new consolidated metric ball $B(R_C, E)$ is formed using methods described herein. Data values corresponding to the consolidated metric ball radius 30 and the new event message ($B(R_{MIN}, E)$) are added to the event table, preferably after the last set of data entries. The data entries relating to the existing flagged metric balls 8 are then deleted and the method returns to check if there are any further event logs 2 to be analysed.

Once the event table is created it can be used for various log 2 analysis purposes. Each metric ball 8 entry in the event table represents a syslog message/event cluster. To determine which event cluster 6 a given a syslog message 4 (that has already been included in the clustering analysis) belongs to we only need to find out which metric ball 8 in the event table contains the given event message. There will be exactly one metric ball 8 which will contain the given event.

It is simple to determine if a given syslog message 4 belongs to a particular event cluster 6 or not. Let E be the event extracted from the given syslog message 4 and let B(R, X) be a metric ball 8 entry in the event table representing a syslog event cluster 6 where X is the central event message 10 for that metric ball. Then, either B(R, X) is an open ball 8 and $d_W(X, E)<R$ or B(R, X) is a closed ball 8 and $d_W(X, E) \leq R$ when the syslog message E belongs to this cluster. Otherwise E does not belong to this cluster.

Sometimes there is a need to analyse new syslog event messages 4 which were not part of the process initially when constructing the event table. This is particularly relevant in the case of online syslog message processing where new syslog messages 4 will continuously be generated and there is a need to maintain an event table that clusters all past messages 4 generated so far. In this case the event table needs to be modified as new messages 4 are processed.

One of the following happens when there is a new syslog message and an existing event table:

1. The syslog message 4 belongs to no event clusters 6. There is therefore a need to extract the event, create a new metric ball, and add this metric ball 8 to the event table.
2. The syslog message 4 belongs to exactly one event cluster. There is no need to do anything in this instance.
3. The syslog message 4 belongs to more than one event cluster. There is need to flag all metric balls 8 that the extracted event belongs to, create a consolidated metric ball 8, 28 as described herein, remove all flagged metric ball 8 entries from the event table and add the consolidated metric ball 8, 28 entry.

Results

The method according to the third aspect, (using the method of the first aspect using a hexadecimal comparative set and a first predefined metric character distance of 0 and a second predefined character metric distance of 1; with the method of the second aspect using equations 8-12) was implemented as an algorithm. The algorithm was implemented in Perl programming language and evaluated using Blue Gene/L supercomputer logs 2 available from Sandia National Laboratories. Table 2 and Table 3 show the results when running the algorithm to analyse, respectively, 1 day, 1 week, 2 weeks, 4 weeks, 8 weeks, and 20 weeks of Blue Gene/L log messages 4.

TABLE 2

Number of event clusters vs. number of syslog lines

| | Duration of Log Messages | | | | | | |
|---|---|---|---|---|---|---|---|
| + | 1 DAY | 1 WEEK | 2 WEEKS | 4 WEEKS | 8 WEEKS | 20 WEEKS | |
| XY($R_{min}$ = 1) | 39 | 194 | 242 | 437 | 664 | 1209 | Number of Event Clusters |
| XY($R_{min}$ = 5) | 19 | 152 | 187 | 317 | 466 | 693 | |
| MTT/SLCT | 124 | 8,934 | 9,362 | 21,805 | 58,576 | 69,688 | |
| Number of Log Messages | 16,851 | 222,609 | 837,178 | 1,384,976 | 2,935,994 | 3,691,534 | |

Table 2 shows the number of log messages 4 and number of event clusters 6 found. The numbers of event clusters 6 found using the method presented herein are shown for algorithms using a minimum radius $R_{MIN}$ of 1 and 5. The results of an MTT/SLCT clustering algorithm are shown in comparison. The present method reduces the number of event clusters 6 formed to 1% or 2% of that of the SLCT algorithm. For example, 20 Weeks of Blue Gene/L log 2 has approximately 3.7 million lines. The SLCT algorithm assigns them into ~70,000 clusters, The present method with minimum radii of 1 and 5 respectively put them into approximately 1200 and 700 event clusters 6. This is a reduction to 1% or 2% of the number of clusters found by the existing SLCT algorithm and shows that the present method provides a clustering method that outputs a number of clusters 6 that is more suitable for further analysis.

hence the character weighting factor as described in equation 12 introduces a non-zero integer metric distance between these similar messages 4.

However, for the same log 2 when the minimum radius 30 is 5 there is the following single representative:

RAS KERNEL INFO generating core.304

With this larger minimum radius 30, the other two events ending in '17' and '3616', when analysed, fell within the existing ball 8 centred on the already analysed event '304', hence, no new balls 8 were formed.

Clearly, a minimum radius 30 of 1 produces 3 clusters 6 of the format 'generating core' whereas minimum radius 30 of 5 produces just 1 cluster 6 of the same format.

The accuracy of the method was 100% when evaluated with Blue Gene/L log messages 4. This was visually inspected and verified for the Blue Gene/L logs 2 for up to

TABLE 3

Minimum radius vs. number of event clusters

| | Duration of Log Messages | | | | | | |
|---|---|---|---|---|---|---|---|
| + | 1 DAY | 1 WEEK | 2 WEEKS | 4 WEEKS | 8 WEEKS | 20 WEEKS | |
| XY($R_{min}$ = 1) | 39 | 194 | 242 | 437 | 664 | 1209 | Number of Event Clusters |
| XY($R_{min}$ = 2) | 24 | 161 | 199 | 365 | 566 | 939 | |
| XY($R_{min}$ = 3) | 22 | 156 | 191 | 343 | 514 | 815 | |
| XY($R_{min}$ = 4) | 20 | 154 | 189 | 325 | 483 | 729 | |
| XY($R_{min}$ = 5) | 19 | 152 | 187 | 317 | 466 | 693 | |
| XY($R_{min}$ = 6) | 19 | 151 | 186 | 263 | 407 | 623 | |
| XY($R_{min}$ = 7) | 19 | 148 | 183 | 253 | 391 | 593 | |
| XY($R_{min}$ = 8) | 18 | 144 | 177 | 247 | 369 | 565 | |
| XY($R_{min}$ = 9) | 18 | 139 | 171 | 234 | 219 | 166 | |
| XY($R_{min}$ = 10) | 18 | 132 | 165 | 225 | 211 | 156 | |

Table 3 shows how the number of clusters 6 varies with minimum radius 30. For a given minimum radius 30 and given order of processing log messages 4, the algorithm outputs an event table. The method presented herein therefore may provide varying ways of clustering log messages 4 at least by varying the default minimum radius 30 and/or changing the characters in the comparative set.

The centre points of the metric balls 8 are representative events of clusters 6. A close examination of representative events in the clusters 6 reveals that decreasing/increasing the minimum radius 30 of the algorithm has an effect on the grouping of different length words formed of hexadecimal characters. For example, for 1 day Blue Gene/L logs 2 we have the following representative events when minimum radius 30 is 1:

RAS KERNEL INFO generating core.304
RAS KERNEL INFO generating core.17
RAS KERNEL INFO generating core.3616

Each of the three above logs 2 are covered by different clusters 6 because each one has a different length end word, a week. Each event table output from the algorithm with different minimum radii 30 represented a valid clustering method for given log messages 4. As described above for the 'generating core' string, the algorithm groups them into 1 or 3 clusters 6 depending on the minimum radius 30 but both groupings are acceptable.

When comparing the present method with previous methods, such as Sisyphus and the SLCT algorithm, the present method is more efficient and generates fewer clusters 6 to analyse. The event clustering method used in Sisyphus considers a word appearing a particular position in a log message 4 as a token and subsequently a token considered as an event and used for clustering. This method generates a very large amount of events. The SLCT algorithm overcomes this problem by extracting patterns. While the SLCT algorithm reduces the number of event clusters 6 compared to the Sisyphus algorithm the number of event clusters 6 generated is still high. Further, the SLCT groups all events that it cannot cluster into a new cluster, thereby reducing the accuracy of clustering.

Some of clusters discovered by SLOT algorithm from Blue Gene/L 1 day logs 2 are given below:

RAS KERNEL INFO ddr:
RAS KERNEL INFO generating
RAS KERNEL INFO generating core.385
RAS KERNEL INFO generating core.257
RAS KERNEL INFO generating core.65
RAS KERNEL INFO*double-hummer alignment exceptions
RAS KERNEL INFO 221 double-hummer alignment exceptions
RAS KERNEL INFO 223 double-hummer alignment exceptions
RAS KERNEL INFO 203 double-hummer alignment exceptions
RAS KERNEL INFO 102 double-hummer alignment exceptions
RAS KERNEL INFO 183 double-hummer alignment exceptions
RAS KERNEL INFO 201 double-hummer alignment exceptions
RAS KERNEL INFO 222 double-hummer alignment exceptions
RAS KERNEL INFO 242 double-hummer alignment exceptions
RAS KERNEL INFO 101 double-hummer alignment exceptions
RAS KERNEL INFO 122 double-hummer alignment exceptions
RAS KERNEL INFO 202 double-hummer alignment exceptions
RAS KERNEL INFO 181 double-hummer alignment exceptions
RAS KERNEL INFO 121 double-hummer alignment exceptions Clearly the SLCT algorithm is unable to capture (and hence ignore) decimal/hexadecimal patterns for clustering effectively.

The said methods described herein may be embodied as one or more pieces of software. The said software is preferably held or otherwise encoded upon a memory device such as, but not limited to, any one or more of, a hard disk drive, RAM, ROM, solid state memory or other suitable memory device or component configured to software. The said methods may be realised by executing/running the software. Additionally or alternatively, the said methods may be hardware encoded. The said methods encoded in software or hardware are preferably executed using one or more processors. The said memory and/or hardware and/or processors are preferably comprised as, at least part of, one or more servers and/or other suitable computing systems.

The invention claimed is:

1. A method comprising:
    selecting, via a processor, a plurality of event messages generated by a computing cluster, the event messages comprising unstructured logs of the computing cluster;
    determining, via the processor, message metric distances between the event messages based on combining word metric distances between aligned words of the event messages, determining the word metric distances involving treating aligned numeric characters between the aligned words as matching characters regardless of differences between the aligned numeric characters;
    clustering the event messages into event types based on the message metric distances; and
    storing a record of the event types associated with the event messages, the record used for system diagnostics of the computing cluster.

2. The method of claim 1, wherein determining the word metric distances comprises treating aligned hexadecimal characters between the aligned words as matching characters regardless of differences between the aligned hexadecimal characters.

3. The method of claim 2, wherein the aligned hexadecimal characters comprise {A, B, C, D, E, F, a, b, c, d, e, f, 0, 1, 2, 3, 4, 5, 6, 7, 8, 9}.

4. The method of claim 2, wherein the aligned hexadecimal characters are used to identify at least one of an address and a process identifier and are irrelevant to clustering the event messages.

5. The method of claim 1, wherein the event messages comprise Syslog messages.

6. The method of claim 1, further comprising:
    defining a plurality of areas in metric space, wherein each area comprises at least one of the event types;
    defining an overlap region in metric space wherein at least two of the plurality of defined areas partially overlap;
    determining whether a further event message generated by a computing cluster is located in the overlap region in metric space; and
    updating the record with a further defined area in metric space comprising the further event message.

7. The method of claim 1, wherein determining the word metric distances comprises increasing the word metric distances if the aligned words have a different number of characters.

8. The method of claim 1, wherein determining message metric distances comprises increasing the message metric distances if the event messages have a different number of words.

9. The method of claim 1, wherein storing the record of the event types comprises storing an event table, each entry of the event table comprising one of the event types and the event messages associated therewith.

10. The method of claim 1, wherein the event messages are stored on a parallel, distributed file system.

11. An apparatus comprising:
    a storing system that stores event messages comprising unstructured logs of a computing cluster; and
    a processor coupled to the storing system and configured to perform:
        selecting a plurality of event messages generated by a computing cluster, the event messages comprising unstructured logs of the computing cluster;
        determining message metric distances between the event messages based on combining word metric distances between aligned words of the event messages, determining the word metric distances involving treating aligned numeric characters between the aligned words as matching characters;
        clustering the event messages into matching event types based on the message metric distances; and
        storing a record of the event types associated with the event messages, the record used for system diagnostics of the computing cluster.

12. The apparatus of claim 11, wherein determining the word metric distances involving treating aligned hexadecimal characters between the aligned words as matching characters regardless of differences between the aligned hexadecimal characters.

13. The apparatus of claim 12, wherein the aligned hexadecimal characters comprise {A, B, C, D, E, F, a, b, c, d, e, f, 0, 1, 2, 3, 4, 5, 6, 7, 8, 9}.

14. The apparatus of claim 12, wherein the aligned hexadecimal characters are used to identify at least one of an address and a process identifier and are irrelevant to clustering the event messages.

15. The apparatus of claim 11, wherein the event messages comprise Syslog messages.

16. The apparatus of claim 11, wherein the processor is further configured to:
define a plurality of areas in metric space, wherein each area comprises at least one of the event types;
define an overlap region in metric space wherein at least two of the plurality of defined areas partially overlap;
determine whether a further event message generated by a computing cluster is located in the overlap region in metric space; and
update the record with a further defined area in metric space comprising the further event message.

17. The apparatus of claim 11, wherein determining the word metric distances comprises increasing the word metric distances if the aligned words have a different number of characters.

18. The apparatus of claim 11, wherein determining message metric distances comprises increasing the message metric distances if the event messages have a different number of words.

19. The apparatus of claim 11, wherein storing the record of the event types comprises storing an event table, each entry of the event table comprising one of the event types and the event messages associated therewith.

20. The apparatus of claim 11, wherein the storing system comprises a parallel, distributed file system.

21. The apparatus of claim 11, wherein determining the word metric distances involves treating aligned numeric characters between the aligned words as matching characters regardless of differences between the aligned numeric characters.

22. A system comprising:
a computing cluster that generates and stores event messages on a parallel, distributed file system, the event messages comprising unstructured logs of the computing cluster; and
a server configured to read the stored event messages, the server comprising a processor that is configured to:
determine message metric distances between the event messages based on combining word metric distances between aligned words of the event messages, determining the word metric distances involving treating aligned numeric characters between the aligned words as matching characters such that at least one of an address and a process identifier identified by the aligned numeric characters are made irrelevant to clustering the event messages;
cluster the event messages into event types based on the message metric distances;
cluster the event messages into matching event types based on the message metric distances; and
store a record of the event types associated with the event messages, the record used for system diagnostics of the computing cluster.

23. The system of claim 22, wherein determining the word metric distances involving treating aligned hexadecimal characters between the aligned words as matching characters regardless of differences between the aligned hexadecimal characters.

24. The system of claim 22, wherein the server is further configured to:
define a plurality of areas in metric space, wherein each area comprises at least one of the event types;
define an overlap region in metric space wherein at least two of the plurality of defined areas partially overlap;
determine whether a further event message generated by a computing cluster is located in the overlap region in metric space; and
update the record with a further defined area in metric space comprising the further event message.

25. The system of claim 22, wherein determining the word metric distances comprises increasing the word metric distances if:
the aligned words have a different number of characters; or
the event messages have a different number of words.

26. The system of claim 22, wherein determining the word metric distances involves treating aligned numeric characters between the aligned words as matching characters regardless of differences between the aligned numeric characters.

* * * * *